US007565759B1

(12) United States Patent
Brennan

(10) Patent No.: US 7,565,759 B1
(45) Date of Patent: Jul. 28, 2009

(54) READING FOCUS CARD

(75) Inventor: Joan M. Brennan, 5376 Ferbet Estates Dr., St. Louis, MO (US) 63128

(73) Assignee: Joan M. Brennan, St. Louis, MO (US)

( * ) Notice: Subject to any disclaimer, the term of this patent is extended or adjusted under 35 U.S.C. 154(b) by 403 days.

(21) Appl. No.: 11/636,746

(22) Filed: Dec. 11, 2006

(51) Int. Cl.
*G09B 17/04* (2006.01)
(52) U.S. Cl. .................... 40/124.01; 434/178; 116/235; 116/240
(58) Field of Classification Search .............. 40/124.01; 434/178, 181, 176; 116/235, 240
See application file for complete search history.

(56) References Cited

U.S. PATENT DOCUMENTS

| | | | | |
|---|---|---|---|---|
| 1,658,499 | A * | 2/1928 | Stevens | 116/240 |
| 2,699,748 | A | 1/1955 | Crawford | 116/236 |
| 3,248,050 | A * | 4/1966 | Dickson | 235/89 R |
| 3,982,332 | A * | 9/1976 | Szymczak | 434/181 |
| 4,016,659 | A * | 4/1977 | Merrigan | 434/181 |
| 4,196,529 | A | 4/1980 | Esbensen | 434/427 |
| 4,728,294 | A * | 3/1988 | Bredehorn | 434/327 |
| 5,458,376 | A * | 10/1995 | Biewald | 283/65 |
| 5,584,698 | A | 12/1996 | Rowland | 434/184 |
| D469,121 | S * | 1/2003 | Manzo | D19/34 |
| 6,622,406 | B2 | 9/2003 | Usher et al. | 40/352 |
| D495,740 | S | 9/2004 | Lee | D19/34 |
| 6,832,915 | B1 * | 12/2004 | Kirby | 434/178 |
| 6,863,533 | B2 * | 3/2005 | Palacios | 434/178 |
| 2003/0228559 | A1 | 12/2003 | Hajjar et al. | 434/169 |
| 2004/0248069 | A1 * | 12/2004 | Palacios | 434/178 |
| 2008/0173232 | A1 * | 7/2008 | Smith | 116/240 |

FOREIGN PATENT DOCUMENTS

GB 2114514 A * 8/1983

OTHER PUBLICATIONS

Rief, Sandra F., How to Reach and Teach ADD/ADHD Children, p. 69.
Problems with Glare and Tracking.
Teaching Resource Center, EZC Reader Guides.
Independent Living Aids, Inc., Yellow Acetate Sheet Print Enhancer.
MaxiAids.com, Magna-Typoscope.
Independent Living Aids, Inc., Typoscope 5.5×7.5 inch Reading Guide.
WPS Creative Therapy Store, The Reading Ruler.
ViBAN® eyewear, eBay item 4511439728.
Wizcom Technologies, Inc., Reading pen.

\* cited by examiner

*Primary Examiner*—Cassandra Davis
(74) *Attorney, Agent, or Firm*—Grace J. Fishel

(57) ABSTRACT

A reading focus card that may be used to isolate a block or line of text and act as a concentrator to encourage and promote left to right eye-tracking. The focus card may be used in a variety of ways and may be provided as a kit and assembled by a user. The focus card includes aligned notches and aligned windows in front and rear sheets opening to a left margin of the card. A transparent plastic insert is installed in the windows. Front and rear sheets are held in assembly by an adhesive that allows the sheets to be picked apart multiple times and different inserts installed depending on the individual needs of the user.

10 Claims, 4 Drawing Sheets

READING FOCUS CARD

BACKGROUND OF THE INVENTION

1. Field of the Invention

The present invention relates to a reading focus card to facilitate reading lines of text for persons of all reading ability and age levels.

2. Brief Description of the Prior Art

A broad population of people of all ages have trouble reading because they cannot focus on a block of text. Readers who have difficulty isolating individual blocks of text in a book, magazine or printed sheet may also have trouble eye-tracking in a steady, left to right motion. Unfortunately with children, attention is often centered on differentiating between causes and types of reading problems, e.g., dyslexia, attention deficit disorder (ADA) or attention deficit hyperactivity disorder (ADHD), and treating the child or adolescent with medications, the long term effects of which are not entirely known. Yet the fact is that people with a reading disability may compensate and learn to read well without the need for medical treatment. For some people, an accommodation such as a line-marker card, transparent overlay or "reading ruler" with a colored window help this process.

The above-mentioned accommodations (i.e., line-marker-cards, overlays and reading rulers) help a reader isolate a block of text but they do not promote left to right eye-tracking motion. What is needed is an accommodation that does both and is inexpensive to manufacture such that it can be provided to a user on a trial basis. The addition of color to the isolated block or line of text would also be desirable, but different people are stimulated by different colors or by different colors at different times. It would therefore be desirable if the accommodation permitted a user to experiment with different colors to discover what is best for him or her.

Such an accommodation would be particularly useful with children who as yet are undiagnosed with a reading disorder but who are experiencing difficulty reading. If the accommodation "works" for the user, the time and expense in appointment scheduling, testing and evaluation, by either private or special school district personnel may be avoided, as well as the stigma of being diagnosed with a disability and treatment with drugs. If the accommodation "works," another person is not required for reading success and the accommodation can be used independently by the reader to help build confidence and self-esteem. If the accommodation does not "work" for the user, little is lost.

BRIEF SUMMARY OF THE INVENTION

In view of the above, it is an object of the present invention to provide a focus card that isolates a block or line of text and acts as a concentrator to force left to right eye-tracking motion. It is another object to provide a focus card that can be customized by the user such that the block or line is highlighted in a color that is effective for him or her. Other objects and features of the invention will be in part apparent and in part pointed out hereinafter.

In accordance with the invention, a reading focus card is provided that may be used in a variety of ways selected by a user. The focus card may be provided as a kit and assembled by the user, giving the user a feeling of choice and control.

In major part, the focus card includes a front rectangular sheet, rear rectangular sheet and a transparent plastic insert. The front rectangular sheet has a front side with a tactually pleasing, non-slick surface, an upper and lower edge and right and left edge. There is a notch in the upper edge that extends to the left edge and a rectangular window in the sheet between the upper and lower edge that extends to the left edge.

Rear rectangular sheet of material has a rear side with a slick surface, an upper and lower edge and right and left edge. There is a notch in the upper edge and a window in the sheet in registry with the notch and window in the front rectangular sheet.

An adhesive is provided between the front and rear rectangular sheets for holding the front and rear rectangular sheets and transparent plastic insert in assembly with the transparent plastic insert positioned between the front and rear rectangular sheets in the windows. The adhesive permits disassembly of the reading focus card multiple times such that a different transparent plastic insert may be inserted between the front and rear rectangular sheets.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figures 2, 3:
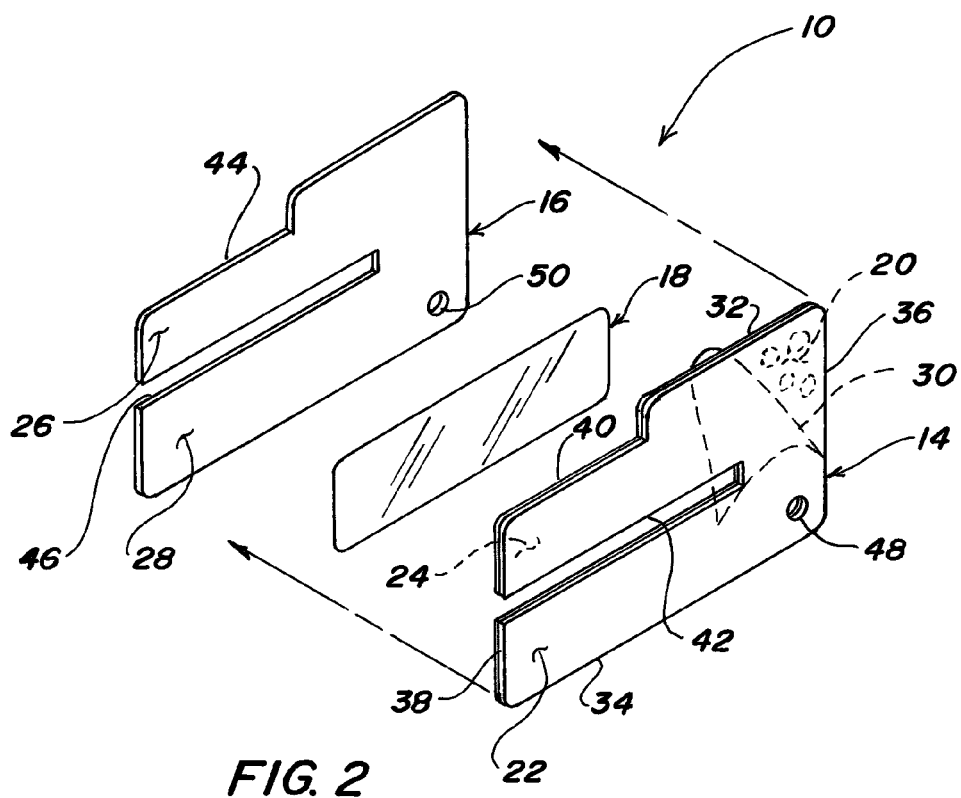
FIG. 2 is an exploded perspective view of the focus card prior to assembly.
FIG. 3 is a perspective view of the focus card after assembly.

Referring to the drawings more particularly by reference character, reference numeral 10 refers to a focus card in accordance with the present invention. Focus card 10 is preferably provided to a user 12 in disassembled form as shown in FIG. 2. As shown therein, focus card 10 includes a front rectangular sheet of material 14 and a rear rectangular sheet of material 16 between which is sandwiched a transparent plastic insert 18. Front sheet 14, rear sheet 16 and transparent plastic insert 18 are held together in assembled condition as shown in FIG. 3 by an adhesive 20 applied to either front sheet 14 or rear sheet 16.

Front rectangular sheet of material 14 has a first or front surface 22 with a tactually appealing, non-slick surface and a second or inside surface 24 to which adhesive 20 can adhere. In one form as shown in FIG. 2, front sheet 14 may be formed of polyfoam, a craft material commercially available from art stores. Rear rectangular sheet of material 16 may be formed of plastic and has a first or rear surface 26 that is slick such that focus card 10 may easily glide over a sheet of paper and a second or inside surface 28 to which adhesive 20 can adhere. An adhesive 20 may be covered with a peel-off sheet or paper film 30 on second surface 24, 28 of front or rear sheet, respectively.

With continuing reference to FIG. 2, front sheet 14 has an upper 32 and a lower edge 34 and a right 36 and a left edge 38. A notch 40 is formed in upper edge 32 opening to left edge 38. A rectangular window 42 is also formed in front sheet 14 between upper and lower edges 32, 34, also opening to left edge 38. Rear sheet 16 also has a notch 44 and a window 46 in registry with notch 40 and window 42 in front sheet 14 when focus card 10 is assembled as shown in FIG. 3.

Transparent plastic insert 18 may be clear or colored such as yellow, green or blue. For some users, the use of color may help them focus on the block or line of text that is to be read. Front sheet 14 may be bland in color such that it does not distract a user and rear sheet 16 may be colored or not. A limited set of inserts 18 may be provided with front sheet 14 and rear sheet 16 as part of a kit such that a user may experiment with different window colors. Too many choices, however, probably should be avoided to avoid frustrating a user. Transparent plastic insert 18 may have magnifying capability and be, for example, a Fresnel lens.

As illustrated in the drawings, front and rear sheets 14, 16 measure about 5"×7" in which form focus card 10 may also be used as a bookmark. Aligned notches 40, 44 and windows 42, 66 may be about 1 cm in height with notches 40, 44 being about 6 cm in width and windows 42, 46 about 9 cm. Notches 40, 44 and windows 42, 46 with these dimensions have been found suitable for the font size of the printed text that is typical for a textbook or magazine. The length of notches 40, 44 and windows 42, 46 permit a user to focus on a group of words, which is necessary for reading comprehension, but not so many words that focus is lost. It will be understood that focus card 10 is not limited to particular dimensions, e.g., 5"×7", 3"×5", etc. For instance, the measurements of front and rear sheets 14, 16 may vary with the column width of the material being read and the height and width of notches 40, 44 and windows 42, 46 may vary with the size of the type.

An aperture 48 may be provided in front sheet 14 adjacent lower and right edges 34, 36 viewed from first or front surface 22 with rear sheet 16 having an aperture 50 adapted to be in registry with aperture 48 when focus card 10 is assembled. Apertures 48, 50 may be used for attachment to a ring of a notebook (not shown) to help user 12 to avoid loss or misplacement and keeps focus card 10 always at hand.

In use, focus card 10 may help beginning and accomplished readers who have trouble focusing their attention on a line of text and eye-tracking in a left to right motion. Focus card 10 has the potential to accommodate persons with focusing challenges that are optometric and/or neurologic in nature. Focus card 10 is inexpensive to manufacture such that a set of focus cards of different dimensions may be purchased.

Focus card 10 may be supplied to user 12 in disassembled form with a set of transparent plastic inserts 18 of different colors (e.g., clear, yellow, green and blue) such that the user may take ownership of the tool by assembling it. Moreover, when focus card 10 is provided as a kit manufacturing costs are minimized and assembly costs saved. If a user's initial selection for plastic insert 18 is unsatisfactory or becomes unsatisfactory in time, adhesive 20 is selected such that front and rear sheets 14, 16 may be picked apart. Insert 18 can then be peeled off and a different insert 18 of another color positioned between windows 42, 46. As aforementioned, the color or lack thereof may be customized by user 12 to what is effective for him or her. There is no complicated testing procedure: The user will know straight away which color "works." The choice may facilitate success and contribute to the feeling of being empowered to read and learn.

Focus card 10 may be used independently by user 12 to build confidence and self-esteem in his or her reading skills.

Figure 1:
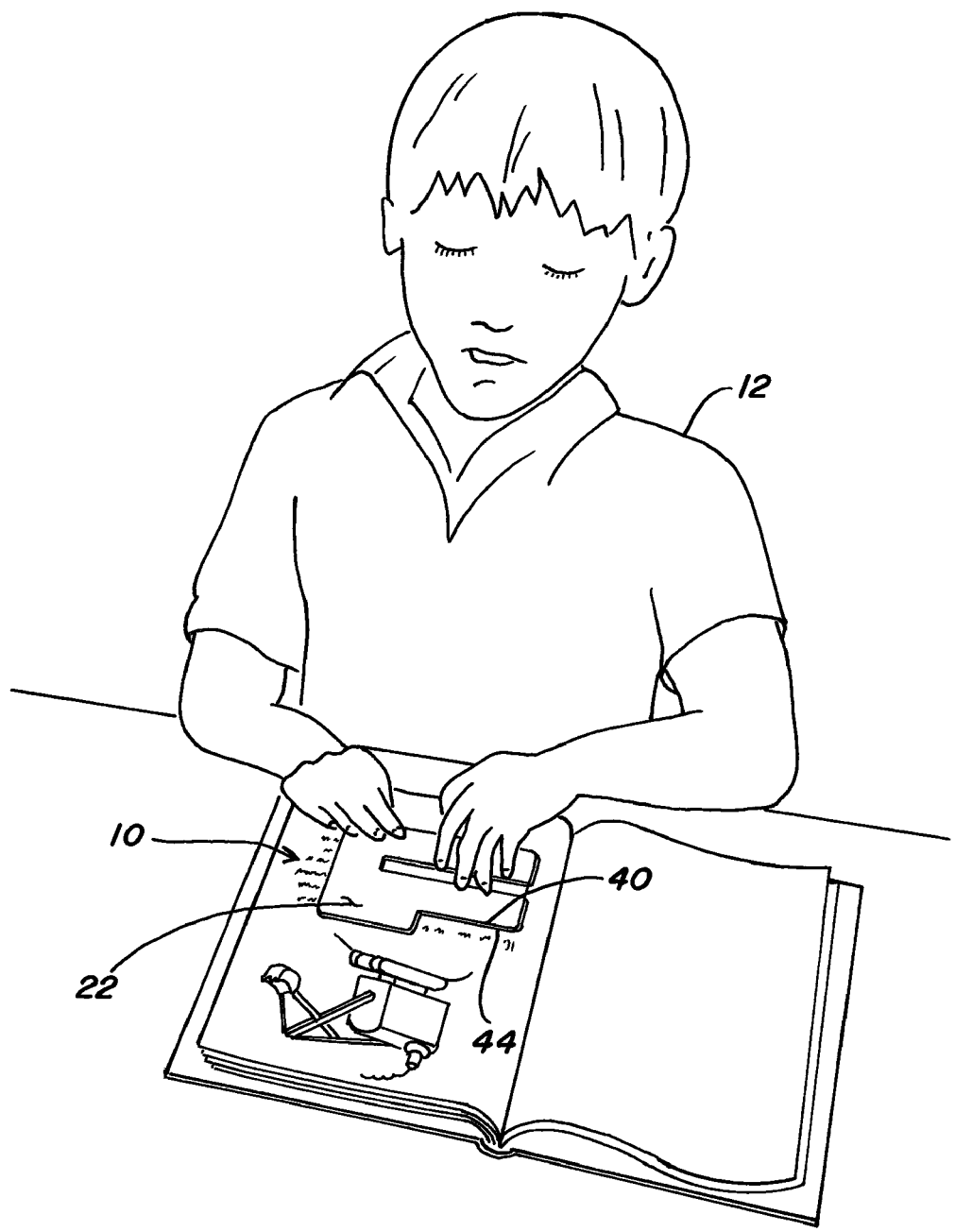
FIG. 1 is a perspective view of a child using a reading focus card in accordance with the present invention.
Figure 4:
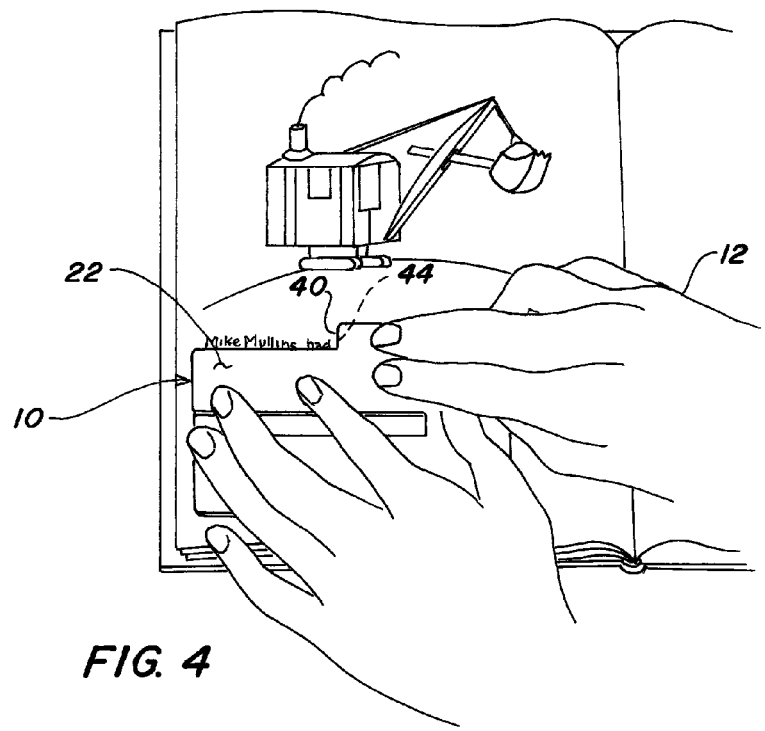
FIG. 4 illustrates use of a notch opening to the left along the top edge of the focus card as a reading aid.
Figure 5:
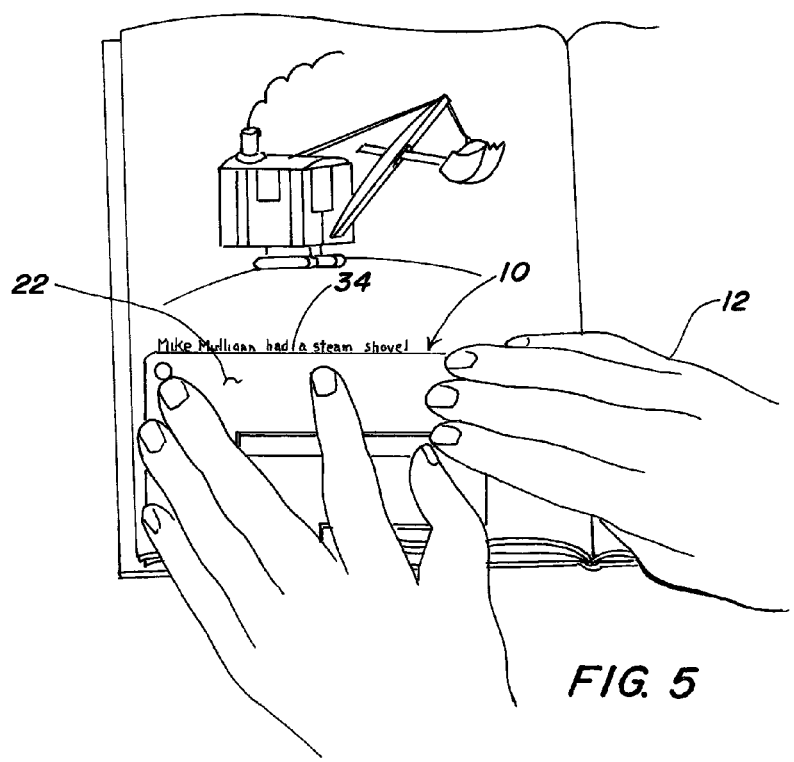
FIG. 5 illustrates use of a bottom edge of the focus card as a reading aid.
Figure 6:
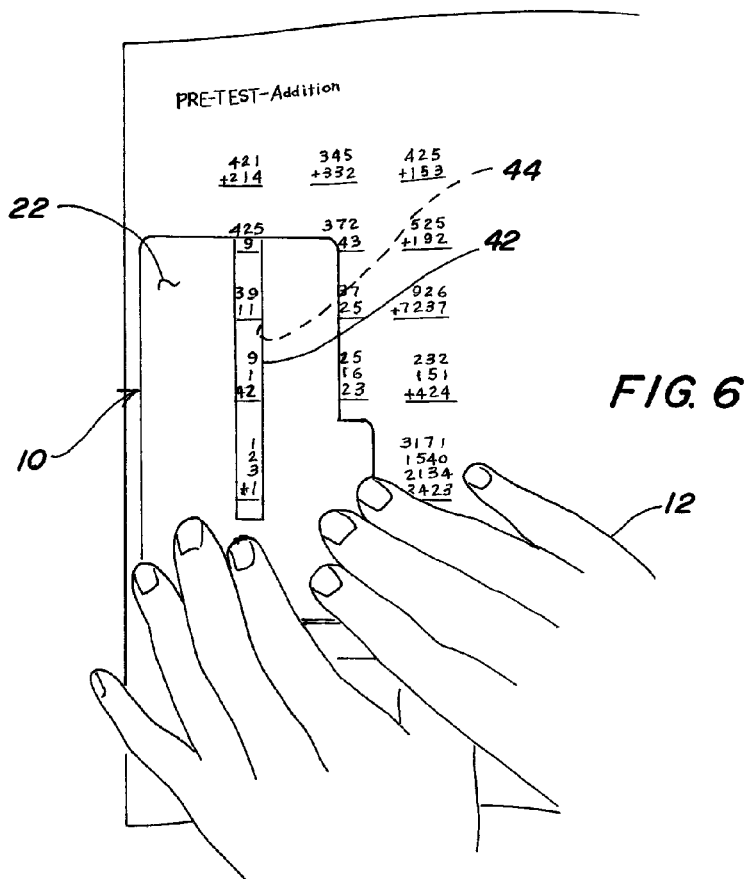
FIG. 6 illustrates use of a window as a reading aid with columns of numbers; and, FIG. 7 illustrates use of the window opening to the left as a reading aid with a block or line of text.
Figure 7:
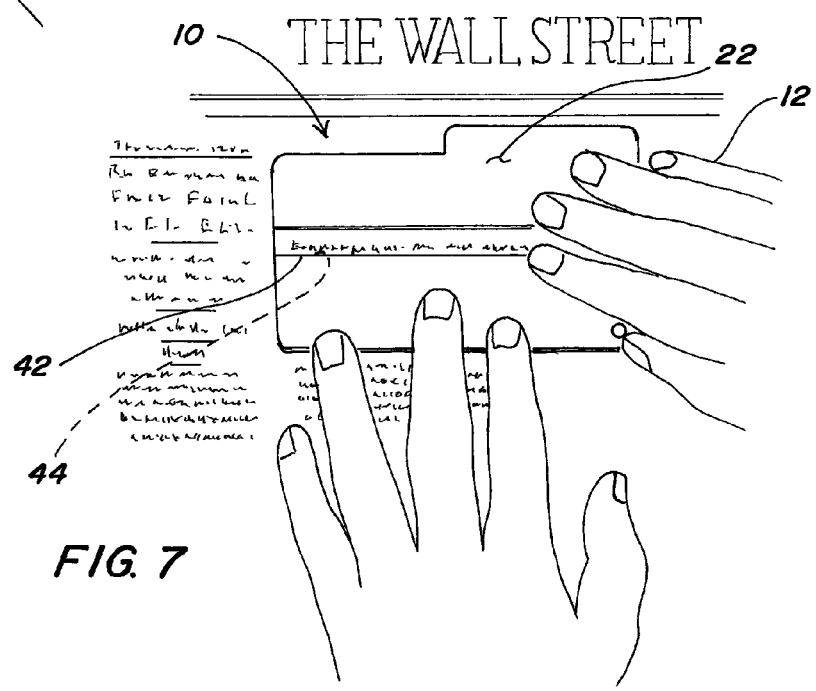

Focus card 10 is versatile in the manner in which it can be used. Referring to FIGS. 1 and 4, it is seen that user 12 may use aligned notches 40, 44 of focus card 10 to isolate a block or line of text. Other users as shown in FIG. 5, may prefer to use aligned lower edge 34 as a reading ruler. Still other users as shown in FIGS. 6 and 7 may prefer to use aligned windows 42, 46 to isolate a block or line of text or a column of numbers. Users who use focus card 10 in this manner may benefit from using a colored transparent plastic insert 18 as a highlighter. Nor must a user always use focus card 10 in the same manner, further contributing to the feeling of being empowered. Whichever way focus card 10 is used, notches 40, 44 and windows 42, 46 act as a concentrator to encourage or promote left to right eye-tracking or top to bottom eye-tracking with columns.

A child's academic success is often dependent on his or her ability to attend as independently as possible to tasks, teachers and classroom expectations. In school, focus card 10 can be used for standardized test taking (i.e., helping the student focus on the correct line of "bubbles" on standardized achievement tests, etc.). Aligned apertures 48, 50 may be used to attach focus card 10 to a ring of a key chain or a loose leaf binder (not shown). This is an advantage because it is not unusual for a person having trouble reading to also have a propensity for losing things or disorganization. Aligned apertures 48, 50 in focus card 10 may help keep the student organized.

Focus card 10 may be used independently by a person having difficulty reading. If focus card 10 helps, user 12 may overcome the difficulty without medical or other intervention. On the other hand, if focus card 10 does not help, it may be laid aside without prejudice at a cost that is minuscule compared to what is saved (i.e., testing, drugs, stigma, etc.) for those whom it "works."

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A reading focus card comprising
a front rectangular sheet of material having a front side with a tactually pleasing, non-slick surface, an upper and a lower edge and a right and a left edge, said upper edge having a notch extending to the left edge, a rectangular window formed in the sheet between the upper and lower edge and extending to the left edge;
a rear rectangular sheet of material having a rear side with a slick surface, an upper and a lower edge and a right and a left edge, and a notch in the upper edge and a window in the sheet in registry with the notch and the window in the front rectangular sheet,
a transparent plastic insert between the front and rear rectangular sheets positioned in the windows; and,
an adhesive between the front and rear rectangular sheets for holding the front and rear rectangular sheets and transparent plastic insert in assembly, said adhesive permitting disassembly of the reading focus card multiple times such that a different transparent plastic insert may be inserted between the front and rear rectangular sheets.

2. The reading focus card of claim 1 wherein the transparent plastic insert in the windows is clear.

3. The reading focus card of claim 1 wherein the transparent plastic insert in the windows is colored.

4. The reading focus card of claim 1 wherein the transparent plastic insert in the windows is colored yellow, green or blue.

5. A reading focus card provided as a kit for assembly by a user, said kit comprising a front rectangular sheet of material having a first and a second side, said first side having a tactually pleasing, non-slick surface and an upper and a lower edge and a right and a left edge, said upper edge having a notch extending to the left edge, a rectangular window formed in the sheet between the upper and the lower edges and extending to the left edge;

a rear rectangular sheet of material having a first and a second side, said first side having a slick surface, an upper and a lower edge and a right and a left edge, and a notch in the upper edge and a window in the sheet adapted to be in registry with the notch and window in the front rectangular sheet, a transparent plastic insert adapted to be positioned in the windows between the second side of the front and rear rectangular sheets; and, an adhesive layer with a peel-off strip applied to either the second side of the front rectangular sheet or the second side of the rear rectangular sheet, said adhesive layer adapted to hold the front and rear rectangular sheets and transparent plastic insert in assembly when the peel-off strip is removed, said adhesive layer permitting disassembly of the reading focus card multiple times such that a different transparent plastic insert may be inserted between the front and rear rectangular sheets.

6. The reading focus card of claim 5 wherein the front rectangular sheet has an aperture in the sheet adjacent the lower and left edges of the first side and wherein the rear rectangular sheet has an aperture adapted to be in registry with the aperture in the front rectangular sheet, said apertures adapted to receive a ring of a ring binder.

7. The reading focus card of claim 5 wherein the transparent plastic insert in the windows is clear.

8. The reading focus card of claim 5 wherein the transparent plastic insert in the windows is colored.

9. The reading focus card of claim 8 wherein the transparent plastic insert in the windows is colored yellow, green or blue.

10. The reading focus card of claim 5 wherein the transparent plastic insert has magnifying capability.

\* \* \* \* \*